(12) United States Patent
Casper et al.

(10) Patent No.: US 8,312,242 B2
(45) Date of Patent: Nov. 13, 2012

(54) TRACKING MEMORY SPACE IN A STORAGE SYSTEM

(75) Inventors: Corene Casper, Pleasant Grove, UT (US); Terence M. Rokop, Aloha, OR (US); Samuel Revitch, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 553 days.

(21) Appl. No.: 12/261,069

(22) Filed: Oct. 30, 2008

(65) Prior Publication Data
US 2010/0125583 A1 May 20, 2010

(51) Int. Cl.
*G06F 12/00* (2006.01)
(52) U.S. Cl. ....................................... 711/170
(58) Field of Classification Search .................. None
See application file for complete search history.

(56) References Cited

U.S. PATENT DOCUMENTS

| | | | |
|---|---|---|---|
| 5,317,739 A | 5/1994 | Elko | |
| 5,940,813 A | 8/1999 | Hutchings | |
| 6,148,333 A | 11/2000 | Guedalia | |
| 6,175,900 B1 * | 1/2001 | Forin et al. | 711/156 |
| 6,963,882 B1 | 11/2005 | Elko | |
| 7,100,089 B1 | 8/2006 | Phelps | |
| 7,243,115 B2 | 7/2007 | Manley | |
| 7,328,305 B2 | 2/2008 | Kleiman | |
| 7,539,988 B1 | 5/2009 | Hersh | |
| 7,698,708 B1 | 4/2010 | Lent | |
| 7,873,619 B1 | 1/2011 | Faibish | |
| 7,890,555 B2 | 2/2011 | Gunda | |
| 2003/0182389 A1 | 9/2003 | Edwards | |
| 2005/0246397 A1 | 11/2005 | Edwards | |
| 2005/0246612 A1 | 11/2005 | Leis | |
| 2006/0161678 A1 | 7/2006 | Bopardikar | |
| 2006/0282471 A1 | 12/2006 | Mark | |
| 2006/0288026 A1 | 12/2006 | Zayas | |
| 2008/0005133 A1 | 1/2008 | Khalidi | |
| 2009/0019047 A1 | 1/2009 | Anderson | |
| 2009/0193122 A1 | 7/2009 | Krishamurthy | |
| 2009/0271456 A1 | 10/2009 | Kushwah | |
| 2010/0049754 A1 | 2/2010 | Takaoka | |
| 2010/0114849 A1 | 5/2010 | Kingsbury | |
| 2010/0115009 A1 | 5/2010 | Callahan | |
| 2010/0115011 A1 | 5/2010 | Callahan | |
| 2010/0131474 A1 | 5/2010 | Zayas | |

FOREIGN PATENT DOCUMENTS

| | | |
|---|---|---|
| WO | 2010050943 A1 | 5/2010 |
| WO | 2010050944 A1 | 5/2010 |

* cited by examiner

Primary Examiner — Hiep Nguyen

(57) ABSTRACT

One embodiment is a method that uses a hierarchical bitmap tree in a storage system to store where available and unavailable memory space exists. Bitmap blocks are retrieved from the hierarchical bitmap tree to locate the available memory space.

17 Claims, 3 Drawing Sheets

TRACKING MEMORY SPACE IN A STORAGE SYSTEM

CROSS-REFERENCE TO RELATED APPLICATIONS

This application relates to the following patent applications which are filed concurrently herewith and incorporated herein by reference: Ser. No. 12/261,064 entitled ALLOCATING PRIORITIES TO PREVENT DEADLOCKS IN A STORAGE SYSTEM; PCT/US08/81661 entitled CREATING SNAPSHOTS OF A FILE SYSTEM; Ser. No. 12/261,068 entitled MANAGING COUNTERS IN A DISTRIBUTED FILE SYSTEM; PCT/US08/81664 entitled ONLINE CHECKING OF DATA STRUCTURES OF A FILE SYSTEM; and Ser. No. 12/261,071 entitled ENUMERATING METADATA IN FILE SYSTEM DIRECTORIES.

BACKGROUND

Filesystems track where data is stored in memory and where free or available space exists in memory. Bitmaps are one way to track this free space.

A bitmap is an array of bits in which each bit corresponds to a block of memory. A logical 1 or 0 indicates whether the block of memory is available for storage or full. Bitmaps generally require low overhead since each bit represents a relatively large block of memory, for example 1 bit for each 4K block size.

The size of the bitmap is easily managed for smaller filesystems but can become inefficient or unmanageable for much larger filesystems. For example, a 32 KB bitmap could be used for a 1 GB filesystem, or a 23 MB bitmap used for a 1 TB filesystem. These bitmaps are small and easily managed. For a much larger filesystem, such as a 1 PB filesystem, 32 GB bitmap would be needed. Managing and scanning a bitmap of this size is time consuming and costly.

Furthermore, traditional bitmaps do not perform well when directly applied to a symmetric clustered file system. Performance is degraded due to cross-server contention over the shared allocation data structures as the servers in the cluster concurrently allocate and free space from the file system. An extension to this approach is a dynamic partition scheme, where the cluster nodes agree to allocate from separate regions of the file system to avoid cross-server contention over the allocation data structures. This approach, however, degenerates as the file system becomes full. As the nodes concurrently search for the remaining free space on the file system, lock contention occurs which slows the performance of the file system.

DETAILED DESCRIPTION

Exemplary embodiments relate to tracking and managing free or available memory space in a storage system. A hierarchical bitmap system or free space map includes multiple bitmap layers that track free space available in a cluster file system.

In one embodiment, a free space map or memory allocation map tracks available (i.e., free) and unavailable (i.e., used) memory space in a storage system. The filesystem uses bitmaps or tables to track which data storage blocks are free and which data storage blocks are used. A hierarchical storage scheme is used so these bitmaps or tables can be quickly searched to determine a location of available memory.

In one embodiment, a lowest layer of the hierarchical bitmap system includes multiple bitmap blocks with each bit corresponding to a block of memory. A second or higher layer in the hierarchy is located above the lowest layer. This second layer includes a bitmap array with each bit corresponding to one of the bitmap blocks in the lowest layer. A "1" or "0" in this second layer indicates whether its corresponding bitmap block in the lowest layer has available memory or is full.

The hierarchical bitmap system enables the filesystem to quickly determine a location of free memory without searching through the entire sequence of bitmap arrays. Bitmap blocks located at the top of the hierarchical bitmap tree represent multiple different blocks of memory or multiple different bitmap blocks. As such, large sections of the bitmap blocks are not required to be searched since a bit higher in the tree corresponds to numerous bitmap blocks. For instance, a logical "1" in a higher branch of the bitmap tree indicates that plural bitmap blocks in a lower branch all have no available memory. Hence, these lower bitmap blocks are not required to be searched for available memory since an indication (i.e., logical "1") in the higher branch indicates these memory blocks in lower branches are all full.

Figure 1:
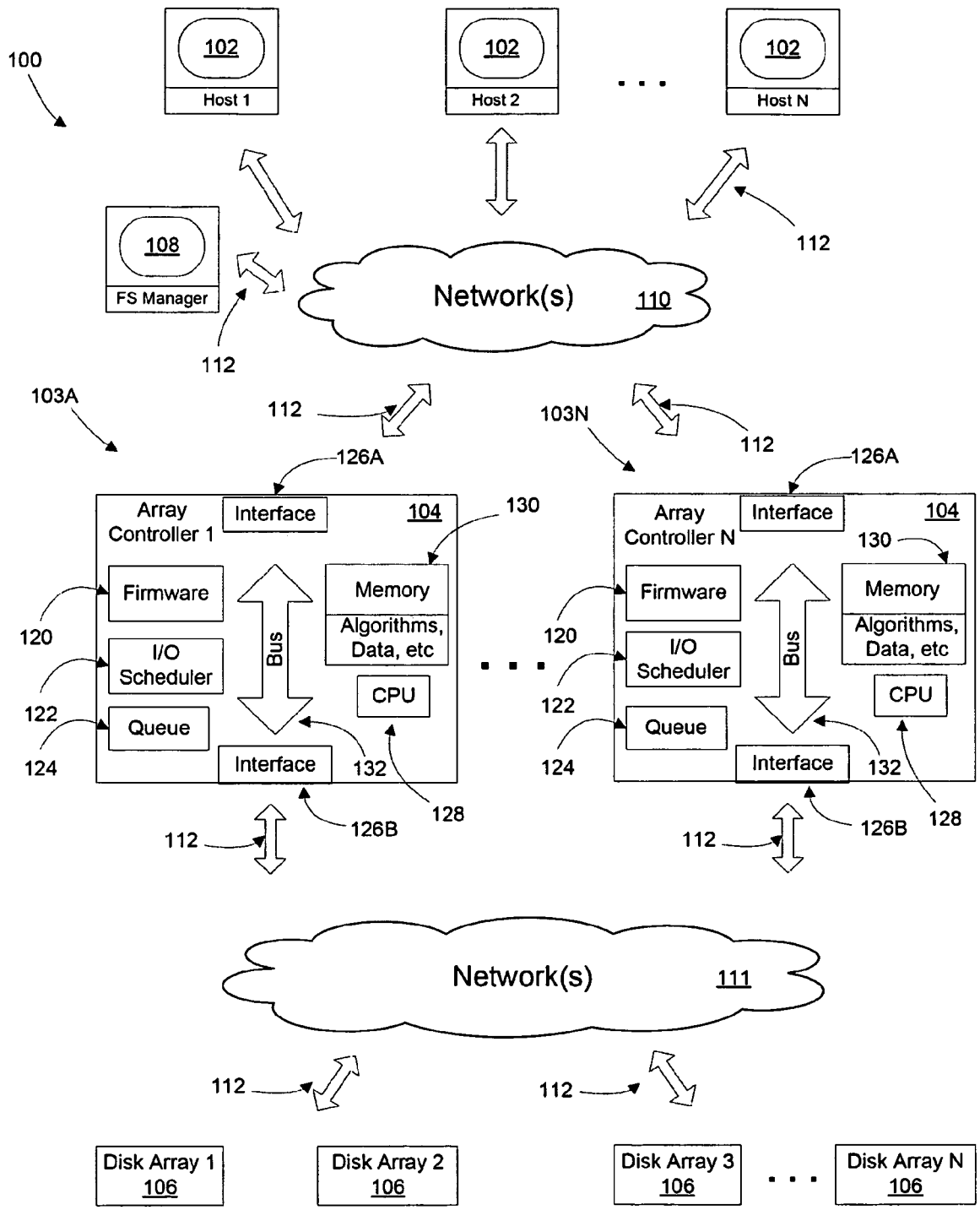
FIG. 1 shows a cluster file system in accordance with an exemplary embodiment of the present invention.

FIG. 1 shows a distributed or cluster storage system 100 in accordance with an exemplary embodiment of the present invention. By way of example, the system is a cluster storage network and/or a storage area network (SAN) that includes a plurality of client computers, nodes, or host computers 102 and one or more storage devices or arrays 103A, 103N that include one or more storage controllers 104 (shown by way of example as an array controller), a plurality of storage devices 106 (shown by way of example as disk array 1 to disk array N), and a file system manager 108 in communication with the storage controllers and devices.

The host computers 102 (shown as host 1 to host N) and file system manager 108 are coupled to the array controllers 104 through one or more fabrics or networks 110, and the storage devices or arrays 103 are coupled to the storage devices 106 through one or more fabrics or networks 111. For instance, the hosts communicate with an array controller using a Small Computer System Interface (SCSI) or other interface/commands over a fiber channel (FC). By way of example, networks 110 and 111 include one or more of the Ethernet, fibre channel (FC), serial attached SCSI (SAS), iSCSI, internet, local area network (LAN), wide area network (WAN), public and/or private networks, etc. Communications links 112 are shown in the figure to represent communication paths or couplings between the hosts, controllers, and storage devices.

The filesystem manager 108 stores and organizes computer files so the files and corresponding data can be managed and discovered for the host or client computers 102. By way of example, in one embodiment the file system manager is included in a server (such as being a file system driver in a server computer). As discussed in more detail below, the filesystem manager 108 uses a hierarchical storage scheme (such as a bitmap tree) to track and/or determine used and free storage space in the storage system.

In one exemplary embodiment, the storage devices (such as array controller 104 and disk arrays 106) are network attached devices providing random access memory (RAM) and/or disk space (for storage and as virtual RAM) and/or some other form of storage or storage device, such as magnetic memory (example, tapes), micromechanical systems (MEMS), or optical disks, to name a few examples. Typically, storage devices include larger amounts of RAM and/or disk space and one or more specialized devices, such as network disk drives or disk drive arrays, (example, redundant array of independent disks (RAID)), high speed tape, magnetic random access memory (MRAM) systems or other devices, and combinations thereof. In one exemplary embodiment, the storage devices include one or more servers.

The storage controller 104 manages various data storage and retrieval operations. Storage controller 104 receives I/O requests or commands from the host computers 102, such as data read requests, data write requests, maintenance requests, etc. Storage controller 104 handles the storage and retrieval of data on the multiple disk arrays 106 and disk groups. In one exemplary embodiment, storage controller 104 is a separate device or may be part of a computer system, such as a server. Additionally, the storage controller 104 may be located with, proximate, or a great geographical distance from the disk arrays 106 or from each other.

The array controller 104 includes numerous electronic devices, circuit boards, electronic components, etc. By way of example, the array controller 104 includes firmware 120, an input/output (I/O) scheduler 122, a queue 124, one or more interfaces 126, one or more processors 128 (shown by way of example as a CPU, central processing unit), and memory 130 (including read and write cache). CPU 128 performs operations and tasks necessary to manage the various data storage and data retrieval requests received from host computers 102. For instance, processor 128 is coupled to a host interface 126A that provides bidirectional data communications to one or more host computers 102. Processor 128 is also coupled to an array interface 126B that provides bidirectional data communications to the disk arrays 106.

Memory 130 is also coupled to processor 128 and stores various information used by processor when carrying out its tasks. By way of example, memory 130 includes one or more of volatile memory, non-volatile memory, or a combination of volatile and non-volatile memory. The memory 130, for example, stores applications, data, control programs, algorithms (including software to implement or assist in implementing embodiments in accordance with the present invention), and other data associated with the storage device (example, state data such as mapping metadata, configuration metadata, and cached user data). The processor 128 communicates with memory 130, interfaces 126, and the other components via one or more buses 132.

Figure 2:
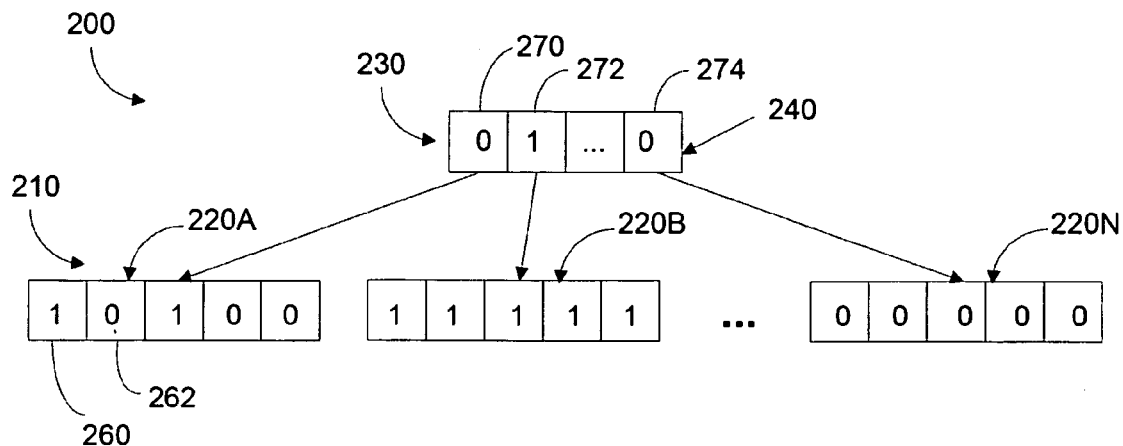
FIG. 2 shows a hierarchical bitmap system in accordance with an exemplary embodiment of the present invention.

FIG. 2 shows a free space map, memory allocation map, or hierarchical bitmap system 200 in accordance with an exemplary embodiment of the present invention. The system includes multiple bitmap blocks arranged in a hierarchical structure with multiple layers, branches, or levels. A bottom or lowest layer or branch 210 includes plural bitmap blocks 220A, 220B, . . . 220N. A second, top, or higher layer or branch 230 includes a bitmap block 240.

Each bitmap block includes an array of bits having a logical "1" or "0." A logical "1" or "0" indicates whether the block of memory is available for storage or full. For example, a "1" indicates that a block of memory is available or free; and a "0" indicates that the block of memory is unavailable or used. Alternatively, a "1" indicates that a block of memory is unavailable or used; and a "0" indicates that the block of memory is available or free.

In the lower layer or branch 210, each bit in each block of the bitmap corresponds to one data storage block. For instance, bitmap block 220A includes a logical "1" in a first block 260 which indicates that the data storage block corresponding to block 260 is full. By contrast, a second block 262 includes a logical "0" which indicates that the data storage block corresponding to block 262 is empty or available for storage.

In the second layer or branch 230, each bit in each block of the bitmap corresponds to one of the bitmap blocks in the lower layer 210. A logical "1" indicates that the corresponding lower bitmap block is full; and a logical "0" indicates that the corresponding lower bitmap block has one or more empty data storage blocks. For instance, block 270 includes a logical "0" which indicates that bitmap block 220A has one or more free data storage blocks (i.e., the second, fourth, and fifth bits being "0" in bitmap block 220A). Block 272 includes a logical "1" which indicate that bitmap block 220B is full (i.e., all bits are marked with a "1" which indicates no available or free space in bitmap block 220B).

A hierarchical bitmap tree describes the allocated/free state for each block on the file system and is managed as a highly concurrent tree data structure. The leaf nodes (i.e., bitmap blocks) of the branches contain bitmap-style allocated/free state for the space-managed regions of the filesystem. Along with this detailed state in the tree leaves is summary state that includes a count of free blocks of each available size. This summary information is propagated up to the higher levels of the space manager tree data structure by having each internal node of the tree provide summary information for the level(s) of the tree below it. With this data structure in place, clients of the file system space manager can immediately obtain a summary view of what lies beneath any point of the tree and determine whether the desired item can be found anywhere in a branch of a tree. This eliminates I/O and associated cross-node lock contention that would have been required to process the lower levels of the tree. A lazy update scheme for higher level summary state is also used to avoid needing to update all parent summary state up to the root with each individual allocate or free operation.

Figure 3:
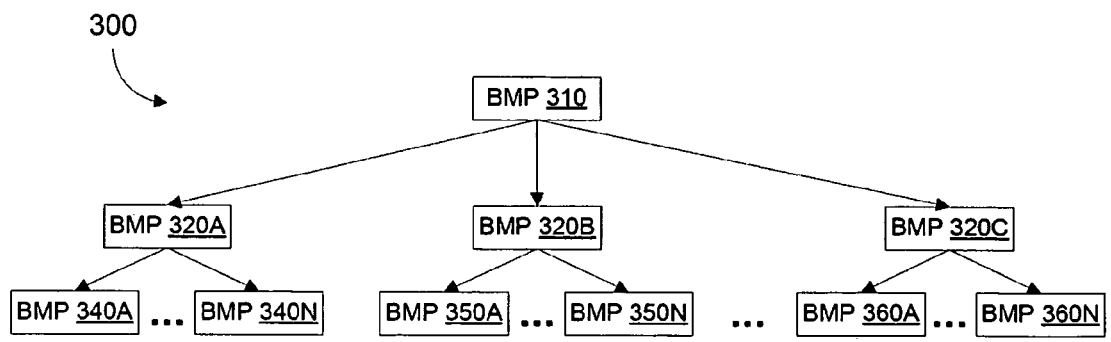
FIG. 3 shows a hierarchical bitmap tree in accordance with an exemplary embodiment of the present invention.

FIG. 3 shows a hierarchical bitmap tree 300 in accordance with an exemplary embodiment of the present invention. The tree includes a top or root bitmap block (BMP) 310; a second layer with bitmap blocks 320A, 320B, . . . 320N; and a third layer with bitmap multiple bitmap blocks 340A . . . 340N, 350A . . . 350N, and 360A . . . 360N.

For convenience of illustration, only a few bitmap blocks and layers are shown in the hierarchical bitmap tree 300. The tree, however, can include many more bitmap blocks and layers.

With exemplary embodiments, available space is quickly discovered even in clustered or distributed filesystems having large amounts of shared memory. For instance, if bitmap block 320A includes all logical "1s" then the memory associated with bitmap blocks 340A to 340N is full. Thus, the filesystem would not spend processing time to search bitmap blocks 340A to 340N for available memory since a bit in bitmap block 310 would be set to "1" indicating no available memory.

In one embodiment, the size of the tree and/or bitmap blocks is dynamic and changes as the size of memory in the file system increases or decreases. For example, when blocks of memory (such as hard disks or other storage medium) are added to the file system, bits corresponding to these blocks of memory are added to a bitmap block in the tree. With larger expansions of memory, entire bitmap blocks or branches are added to the tree. As such, the tree grows (i.e., increases and decreases) in size as the amount of memory in the file system changes.

In one embodiment, updates to higher level branches or layers are prioritized over updates to lower level branches or layers. Looking to FIG. 3 for example, updates to bitmap blocks 320A, 320B, and 320C occur before and are prioritized over updates to bitmap blocks 340A . . . 340N, 350A . . . 350N, and 360A . . . 360N.

One exemplary embodiment is a method for free space management in a distributed or clustered file system that enables highly efficient allocation and tracking of available memory. This method allows cluster nodes to, in the common case, allocate and free space from the file system without actively negotiating with other nodes at the time of the allocation or free. As the filesystem contents nears capacity and the remaining free space becomes more highly contended, communication among the cluster nodes becomes required to negotiate the use of this remaining free space. But even in this case, this negotiation and corresponding cluster-wide lock contention is minimized using the allocation summary state information kept in the multi-level free space tracking meta-data structures of the file system.

Figure 4:
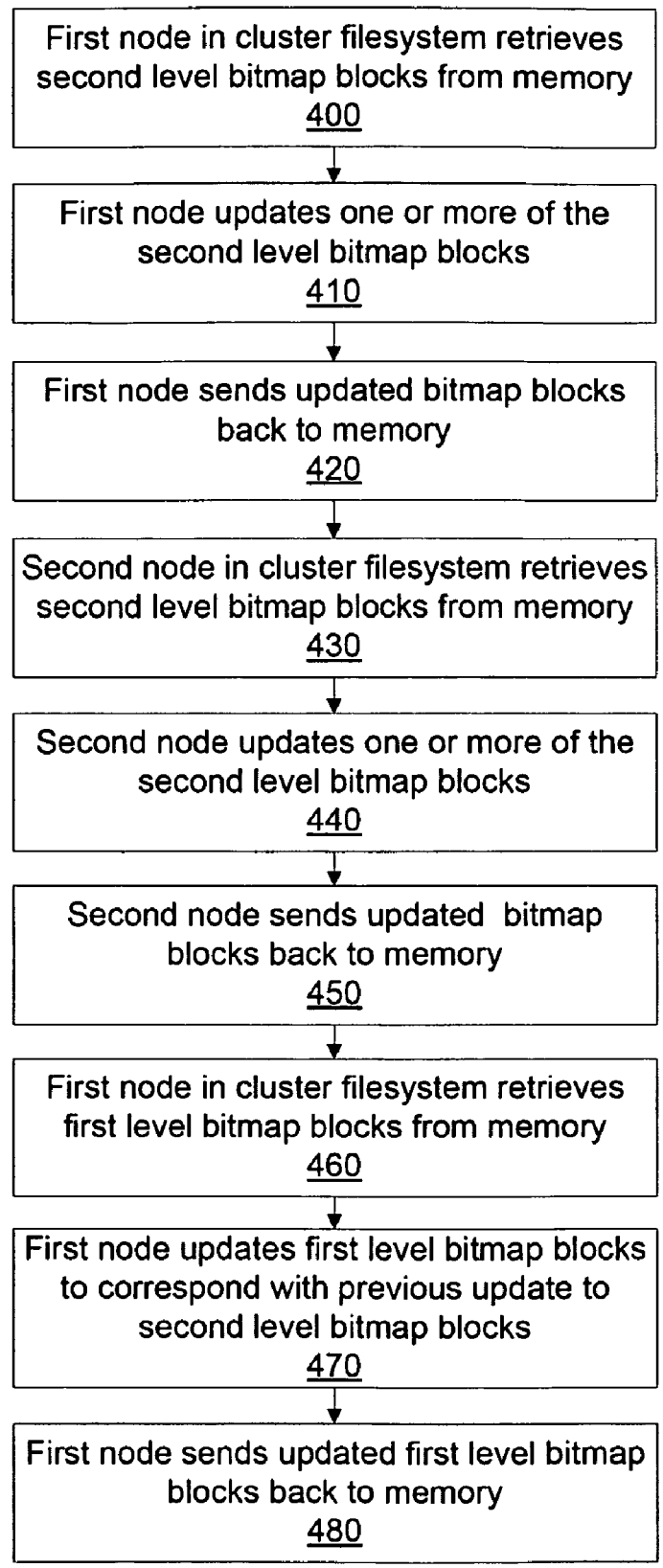
FIG. 4 shows a flow diagram for tracking and updating memory space using a hierarchical bitmap system in accordance with an exemplary embodiment of the present invention.

FIG. 4 shows a flow diagram for tracking and updating memory space using a hierarchical bitmap system in a file system in accordance with an exemplary embodiment of the present invention. For discussion, the filesystem is a cluster filesystem in accordance with one exemplary embodiment.

According to block 400, a first node in a cluster file system retrieves a second level bitmap block from memory. For example, a computer or server retrieves second layer bitmap blocks from a hard disk (such as retrieving block 230 in FIG. 2 of blocks 320A to 320C in FIG. 3).

According to block 410, the first node updates one or more of the second level bitmap blocks. This update includes changing one or more bits from a "1" to a "0" and/or from a "0" to a "1." For example, the first node changes block 270 in FIG. 2 from a "0" to a "1" to indicate that the corresponding bitmap block 220A is full.

According to block 420, the first node sends the updated second level bitmap blocks back to memory.

According to block 430, a second node in a cluster file system retrieves the second level bitmap block from memory. For example, another computer or server retrieves second layer bitmap blocks from a hard disk (such as retrieving block 230 in FIG. 2 of blocks 320A to 320C in FIG. 3).

According to block 440, the second node updates one or more of the second level bitmap blocks. This update includes changing one or more bits from a "1" to a "0" and/or from a "0" to a "1." For example, the second node changes block 272 in FIG. 2 from a "1" to a "0" to indicate that the corresponding bitmap block 220B is available.

According to block 450, the second node sends the updated second level bitmap blocks back to memory.

According to block 460, the first node in a cluster file system retrieves the first level bitmap block from memory. This first level reports to or forms part of the hierarchical tree for the previously retrieved second level. For example, the first computer or server retrieves a first layer bitmap block from a hard disk (such as retrieving block 220A in FIG. 2).

According to block 470, the first node updates first level bitmap blocks to correspond with previous update to second level bitmap blocks. The first computer or server updates the first layer bitmap block to indicate the change previously made to the second level bitmap block. For example, all bits in bitmap block 220A are changed to logical "1" to indicate that the corresponding data storage blocks are full. This change corresponds to the change previously made in bitmap block 230 (i.e., the change of bit 270 from a logical "0" to a logical "1").

According to block 480, the first node sends the updated first level bitmap blocks back to memory.

With the method of FIG. 4, updates to the hierarchical bitmap tree or table occur less frequently and in less time. In the example provided above, during the first update, the first node only updated the second level bitmap blocks; the first level bitmap block was not updated. This reduced the overall number of updates required and hence reduced the time needed to update the bitmap tree. The second node retrieved the bitmap tree with a current or updated second level.

In one exemplary embodiment, the nodes in the cluster file system do not immediately update the entire bitmap tree. Instead, updates are provided to a higher level (such as roots or branches) and not to lower levels (such as leaves corresponding to the roots or branches). This partial update enables other nodes waiting for the bitmap tree to access the bitmap tree more quickly. For example, in one embodiment, only one node can update the second bitmap tree at one time (i.e., two different nodes cannot simultaneously update the bitmap blocks).

DEFINITIONS

As used herein and in the claims, the following words are defined as follows:

A "bitmap" means a type of memory organization or image file format that stores digital images as a map of bits or an array of bits.

A "data storage block" or "storage block" means specific areas in memory, such as a hard disk. For example, one data storage block is a collection of eight sectors or 4,096 bytes, referred to as 4K bytes.

A "filesystem" or "file system" is a collection of file data, maintained by a filesystem implementation which is a set of data types, methods, and algorithms (typically implemented within an operating system instance) that store, organize, and maintain file data, frequently in some kind of file and/or directory hierarchy (albeit various alternatives and choices exist in the exact organizational structure made manifest by the filesystem implementation to the consumers of the file data). The actual file data and associated filesystem meta-data which describe the location, layout, directory organization, etc. of all file data within the filesystem is in turned stored on a data storage device (e.g., single hard disk, CD-ROM, disk storage array, network attached storage (NAS), etc.).

The term "storage device" means any data storage device capable of storing data including, but not limited to, one or more of a disk array, a disk drive, a tape drive, optical drive, a SCSI device, or a fiber channel device. Further, a "disk array" or "array" is a storage system that includes plural disk drives, a cache, and controller. Arrays include, but are not limited to, networked attached storage (NAS) arrays, modular SAN arrays, monolithic SAN arrays, utility SAN arrays, and storage virtualization.

In one exemplary embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. For example, the software is implemented as one or more modules. The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   using a hierarchical bitmap tree in a filesystem to represent where available and unavailable memory space exists in a storage system, the hierarchical bitmap tree having plural bitmap blocks, wherein each of at least some of the bitmap blocks is associated with summary information about bitmap blocks at a lower level in the hierarchical bitmap tree, and wherein the summary information comprises a count of free storage blocks of one or more available sizes in the memory space; and
   retrieving a particular bitmap block from the hierarchical bitmap tree to locate the available memory space, wherein a size of the hierarchical bitmap tree is dynamic and changes as a size of the memory space in the filesystem increases or decreases.

2. The method of claim 1, wherein the hierarchical bitmap tree includes a lowest level with each bitmap block having bits that correspond to a 4K block size of memory.

3. The method of claim 1 further comprising:
   updating, by a first node, a first bitmap block in a first branch of the hierarchical bitmap tree;
   updating, by a second node, a second bitmap block in the first branch of the hierarchical bitmap tree;
   updating, by the first node, a third bitmap block in a second branch below the first branch, the third bitmap block being updated to correspond to the update of the first bitmap block and being performed subsequent to the second node updating the second bitmap block.

4. The method of claim 1 further comprising, changing bits in the particular bitmap block to indicate when a storage block changes from being available for use to being used by a node in the filesystem.

5. The method of claim 1 further comprising, changing bits in the particular bitmap block to indicate when a storage block changes from being unavailable for use to being available for use by nodes in the filesystem.

6. A tangible computer readable storage medium having instructions for causing a computer to execute a method, comprising:
   updating a bit in a first level of a hierarchical bitmap tree to indicate availability of memory in a storage system;
   updating, subsequent to the updating of the first level, bits in a second level of the hierarchical bitmap tree to correspond to the updating of the bit in the first level;
   prioritizing updates to higher levels in the hierarchical bitmap tree over updates to lower levels in the hierarchical bitmap tree; and
   using the updating of the first and second levels to track the availability of the memory in the storage system, wherein a size of the hierarchical bitmap tree is dynamic and changes as a size of the memory in the storage system increases or decreases.

7. The tangible computer readable storage medium of claim 6, wherein the second level is a branch of the first level.

8. The tangible computer readable storage medium of claim 6, wherein the second level is updated subsequent to plural nodes providing updates to bits in the first level.

9. The tangible computer readable storage medium of claim 6, wherein the hierarchical bitmap tree includes arrays of bits that indicate with a logical 1 and logical 0 the availability of the memory in the storage system.

10. The tangible computer readable storage medium of claim 6 further comprising, adding branches that include bitmap blocks to the hierarchical bitmap tree as a filesystem for the storage system grows.

11. The computer readable storage medium of claim 6, wherein the hierarchical bitmap tree includes bitmap blocks, wherein each of at least some of the bitmap blocks is associated with summary information about bitmap blocks at a lower level in the hierarchical bitmap tree.

12. A server, comprising:
   a filesystem manager to store an indication of available and unavailable memory space in a hierarchical bitmap tree for storage devices in communication with the server, the hierarchical bitmap tree having bitmap blocks, wherein each of at least some of the bitmap blocks is associated with summary information about bitmap blocks at a lower level in the hierarchical bitmap tree, and wherein the summary information comprises a count of free storage blocks of one or more available sizes in the memory space.

13. The server of claim 12, wherein the hierarchical bitmap tree includes a top layer and a bottom layer, with single bits in the top layer representing availability of entire arrays of bits in the bottom layer.

14. The server of claim 12, wherein the hierarchical bitmap tree includes a top layer and a bottom layer, and updates to the top layer are prioritized and occur before updates to the bottom layer.

15. The server of claim 12, wherein the hierarchical bitmap tree uses bits to indicate a count of available space in the storage devices.

16. The server of claim 12, wherein higher levels of the hierarchical bitmap tree are updated before lower levels of the hierarchical bitmap tree to eliminate input/output (I/O) and associated cross-node lock contention between plural clients that simultaneously request access to the storage devices.

17. A method, comprising:
   using a hierarchical bitmap tree in a filesystem to represent where available and unavailable memory space exists in a storage system, the hierarchical bitmap tree having plural bitmap blocks, wherein each of at least some of the bitmap blocks is associated with summary information about bitmap blocks at a lower level in the hierarchical bitmap tree;
   prioritizing updates to higher levels in the hierarchical bitmap tree over updates to lower levels in the hierarchical bitmap tree; and
   retrieving a particular bitmap block from the hierarchical bitmap tree to locate the available memory space, wherein a size of the hierarchical bitmap tree is dynamic and changes as a size of the memory space in the filesystem increases or decreases.

* * * * *